(12) United States Patent
Hattori et al.

(10) Patent No.: US 7,068,252 B2
(45) Date of Patent: Jun. 27, 2006

(54) DISPLAY UNIT CAPABLE OF DISPLAYING TWO- AND THREE-DIMENSIONAL IMAGES AND METHOD FOR CONTROLLING DISPLAY UNIT

(75) Inventors: Tomohiko Hattori, Ogaki (JP); Isao Yokota, Kariya (JP); Kazuto Noritake, Kariya (JP); Masanori Tsuzaka, Kariya (JP); Katsuya Tanase, Kariya (JP)

(73) Assignees: Kabushiki Kaisha Toyota Jidoshokki, Kariya (JP); Sea Phone Co., Ltd., Gifu (JP)

( * ) Notice: Subject to any disclaimer, the term of this patent is extended or adjusted under 35 U.S.C. 154(b) by 0 days.

(21) Appl. No.: 10/869,667

(22) Filed: Jun. 16, 2004

(65) Prior Publication Data

US 2004/0257495 A1    Dec. 23, 2004

(30) Foreign Application Priority Data

Jun. 17, 2003    (JP)    ............................. 2003-172429

(51) Int. Cl.
*G09G 3/36* (2006.01)

(52) U.S. Cl. ........................................................ 345/87
(58) Field of Classification Search .................. 345/55, 345/84, 87–93, 98–100, 102–104
See application file for complete search history.

(56) References Cited

U.S. PATENT DOCUMENTS 4,829,365 A * 5/1989 Eichenlaub .................. 348/54
5,036,385 A * 7/1991 Eichenlaub .................. 348/59
5,101,296 A * 3/1992 Bell ............................ 359/489
6,916,099 B1 * 7/2005 Su et al. ..................... 359/839

FOREIGN PATENT DOCUMENTS

| JP | 9-171156 | 6/1997 |
| JP | 9-281440 | 10/1997 |
| JP | 9-297284 | 11/1997 |
| JP | 11-308642 | 11/1999 |
| JP | 2002-98957 | 4/2002 |

OTHER PUBLICATIONS

Excerpts from Website by Dimension Technologies Inc. (http://www.dti3d.com/technology.asp) entitled "How does the DTI display work?" 5pp Feb. 10, 2004.
U.S. Appl. No. 10/869,218, filed Jun. 16, 2004, Hattori et al.
U.S. Appl. No. 10/869,219, filed Jun. 16, 2004, Hattori et al.

* cited by examiner

*Primary Examiner*—Vijay Shankar
*Assistant Examiner*—Steven Holton
(74) *Attorney, Agent, or Firm*—Morgan & Finnegan, LLP

(57) ABSTRACT

A display unit includes an organic electroluminescence device having light-emitting regions, and a liquid crystal panel having pixels. The liquid crystal panel is spaced apart from the organic electroluminescence device so that the light of each light-emitting region illuminates at least two pixels. An image signal output section provides data of a first image to first pixels of the liquid crystal panel and provides data of a second image to second pixels of the liquid crystal panel. The image signal output section switches the display of the first image and the display of the second image in synchronization with a switching of the emitting of the light-emitting region and non-emitting of another light-emitting region of the organic electroluminescence device by the light-emission control section.

45 Claims, 16 Drawing Sheets

DISPLAY UNIT CAPABLE OF DISPLAYING TWO- AND THREE-DIMENSIONAL IMAGES AND METHOD FOR CONTROLLING DISPLAY UNIT

BACKGROUND OF THE INVENTION

The present invention relates to a display unit for displaying a plurality of images, for example, images with parallax, each at a different position without using an optical directivity member.

A known method of displaying a stereoscopic image without using special glasses includes a lenticular lens method and a parallax barrier method. Japanese Laid-Open Patent Publication No. 9-171156 discloses a stereoscopic image display unit that switches barriers and slots of the parallax barrier in synchronization with the timing of switching the display image.

However, in this stereoscopic display unit, the optical directivity member, such as lenticular lens and parallax barrier, is vital to give directivity to the light passing through each pixel of the liquid crystal panel. The optical directivity member becomes a disadvantage when a compact and thin display unit is required.

SUMMARY OF THE INVENTION

The object of the present invention is to provide a display unit for displaying a plurality of images each at a different position without using an optical directivity member, such as a lenticular lens and parallax barrier, and without lowering the horizontal resolution.

One aspect of the present invention is a display unit for displaying a plurality of images including a first image and a second image, including a light source having a plurality of light-emitting regions and a transmissive image display panel for displaying an image when light from the light source is transmitted therethrough. The transmissive image display panel includes a plurality of pixels and is arranged spaced apart from and facing the light source so that light from each light-emitting region illuminates at least two pixels. A light-emission control section emits at least one first selected light-emitting region among the plurality of light-emitting regions and non-emits at least one second selected light-emitting region among the light-emitting regions adjacent to the at least one first selected light-emitting region. The light-emission control section alternately switches emitting and non-emitting of the at least one first selected light-emitting region and the at least one second selected light-emitting region at a predetermined cycle. An image signal output section provides first image data for displaying the first image to at least one first pixel of the plurality of pixels and provides second image data for displaying the second image to at least one second pixel of the plurality of pixels adjacent to the at least one first pixel. In synchronization with the switching of the emitting and non-emitting of each light-emitting region by the light-emission control section, the image signal output section alternately provides data of an image different from the image, displayed before switching of the emitting and non-emitting of the light-emitting region, to the at least one first pixel and the at least one second pixel.

A further aspect of the present invention is a display unit having a horizontal direction, including a light source having a plurality of parallel light-emitting regions arranged in the horizontal direction for emitting light and a transmissive image display panel for displaying an image when light from the light source is transmitted therethrough, the transmissive image display panel having a plurality of display positions arranged in the horizontal direction and each including a plurality of pixels. An image signal output section equally divides each of a plurality of N images of a first to an Nth image with a continuous parallax to a plurality of divided images, the image signal output section generates image data so that the plurality of divided images of each of the N images is repeatedly displayed in a predetermined order at the plurality of display positions of the transmissive image display panel, respectively, and provides the image data to the plurality of pixels. A light-emission control section simultaneously emits the light-emitting regions for every N-1 light-emitting regions in the horizontal direction and switches the emitting and non-emitting of each light-emitting region at a predetermined cycle. The transmissive image display panel is arranged spaced apart from and facing the light source so that light from each light-emitting region illuminates the pixels related to at least N divided images. In synchronization with the switching of the emitting and non-emitting of each light-emitting region by the light-emission control section, the image signal output section alternately provides data of a divided image, different from the divided image displayed before switching of the emitting and non-emitting of the light-emitting region, to each pixel.

A further aspect of the present invention is a display unit having a horizontal direction, including a light source having a plurality of parallel light-emitting regions arranged in the horizontal direction and a transmissive image display panel for displaying an image when light from the light source is transmitted therethrough, the transmissive image display panel having a plurality of display positions arranged in the horizontal direction and each including a plurality of pixels. An image signal output section equally divides each of a right eye image and a left eye image into a plurality of divided images, generates image data so that the plurality of divided images of the right eye image and the plurality of divided images of the left eye image are alternately displayed at the plurality of display positions of the transmissive image display panel, respectively, and provides the image data to the plurality of pixels. A light-emission control section switches the emitting and non-emitting of the plurality of light-emitting regions at a predetermined cycle so that one of the two adjacent light-emitting region is emitted and the other light-emitting region is non-emitted. The transmissive image display panel is arranged spaced apart from and facing the light source so that the light from each light-emitting region illuminates the pixel related to at least two divided images. The image signal output section alternately provides data of the divided image of the left eye image and data of the divided image of the right eye image to each pixel in synchronization with the switching of the emitting and non-emitting of each light-emitting region by the light-emission control section.

A further aspect of the present invention is a method of controlling a display unit including a light source having a plurality of light-emitting regions and a transmissive image display panel for displaying an image when light from the light source is transmitted therethrough, the transmissive image display panel including a plurality of pixels and being arranged spaced apart from and facing the light source so that the light from each light-emitting region illuminates at least two pixel. The method includes emitting at least one first selected light-emitting region among the plurality of light-emitting regions and non-emitting at least one second selected light-emitting region among the light-emitting regions adjacent to the at least one first selected light-emitting region; alternately switching the emitting and non-emitting of the at least one first selected light-emitting region and the at least one second selected light-emitting region at a predetermined cycle; providing image data to the plurality of pixels so that the at least one first pixel of the plurality of pixels displays a first image and at the same time the at least one second pixel of the plurality of pixels adjacent to the at least one first pixel displays a second image; and controlling the plurality of pixels so that each pixel displays an image, different from the image displayed before switching of each light-emitting region, to display a plurality of images on the transmissive image display panel in synchronization with the switching of the emitting and non-emitting of each light-emitting region at the predetermined cycle.

A further aspect of the present invention is a computer program product for controlling a display device including a light source having a plurality of light-emitting regions, a transmissive image display panel for displaying an image when light from the light source is transmitted therethrough, the transmissive image display panel including a plurality of pixels, and being arranged spaced apart from and facing the light source so that light from each light-emitting region passes through at least two pixels, and a computer for controlling the emitting of the light source and providing an image signal to the display panel. The computer program product comprises recording media enclosed with instruction steps which when executed by the computer cause the computer to perform steps including emitting at least one first selected light-emitting region of the plurality of light-emitting regions and at the same time non-emitting at least one second selected light-emitting region of the light-emitting regions adjacent to the at least one first selected light-emitting region; alternately switching the emitting and non-emitting of the at least one first selected light-emitting region and the at least one second selected light-emitting region at a predetermined cycle; providing image data to the plurality of pixels so that the at least one first pixel of the plurality of pixels displays a first image and at the same time the at least one second pixel of the plurality of pixels adjacent to the at least one first pixel displays a second image; and providing image data to the plurality of pixels so that each pixel displays an image different from the image displayed before switching of each light-emitting region in synchronization with the switching of the emitting and non-emitting of each light-emitting region at the predetermined cycle.

A further aspect of the present invention is a display unit for displaying a stereoscopic image by alternately displaying a first image and a second image. The display unit includes a light source having a plurality of strip-shaped light-emitting regions parallel to each other and a transmissive image display panel for displaying the first image and the second image when light from the light source is transmitted therethrough. The transmissive image display panel includes a plurality of first columns each including a plurality of first pixels and a plurality of second columns each including a plurality of second pixels, in which each of the first column and each of the second column are adjacent to each other. The transmissive image display panel is arranged spaced apart from and facing the light source so that the light from each light-emitting region illuminates one of the first columns and one of the second columns adjacent to each other. A light-emission control section emits a plurality of first light-emitting regions of the plurality of light-emitting regions and non-emits at the same time a plurality of second light-emitting regions adjacent to each of the first light-emitting regions. The light-emission control section alternately switches the emitting and non-emitting of the first light-emitting regions and the second light-emitting regions. An image signal output section provides data of the first image and data of the second image to the plurality of first columns and the plurality of second columns, respectively. The image signal output section displays the first image on the plurality of first columns when the light-emission control section emits the plurality of first light-emitting regions, and displays the second image on the plurality of second columns when the light-emission control section emits the plurality of second light-emitting regions.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
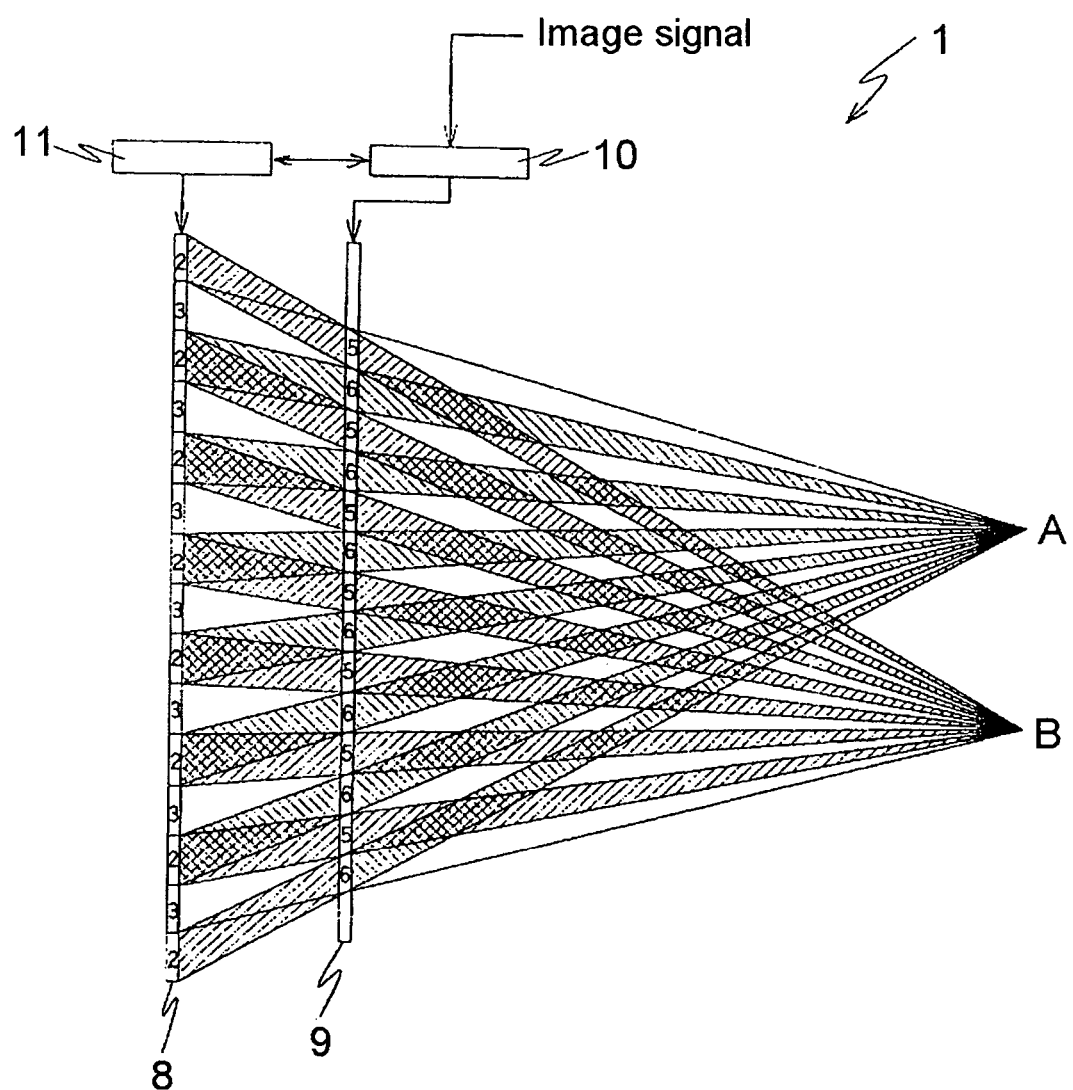
FIGS. 1 and 2 are diagrams each showing light path switching of a transmissive liquid crystal display unit according to a first embodiment of the present invention.

A transmissive liquid crystal display unit for displaying two different images according to a first preferred embodiment of the present invention will now be described with reference to FIGS. 1 to 4.

The transmissive liquid crystal display unit 1 includes a liquid crystal panel 9 serving as a transmissive liquid crystal display panel, an image signal output section 10, a light-emission control section 11, and a planar organic electroluminescence device 8 serving as a light source.

A known thin film transistor LCD may be used as the liquid crystal panel 9.

Figure 4A:
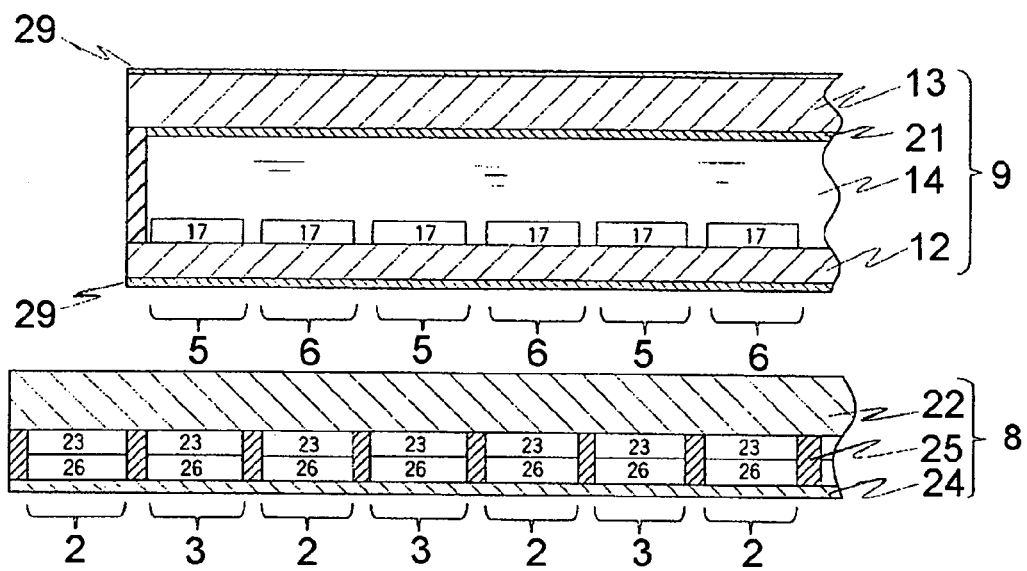
FIG. 4A is a partial sectional view of the transmissive liquid crystal display unit of the first embodiment.

As shown in FIG. 4A, the liquid crystal panel 9 includes a first transparent substrate 12 and a second transparent substrate 13 arranged facing each other or parallel to each other, and a liquid crystal layer 14 held between the first transparent substrate 12 and the second transparent substrate 13.

A polarizing plate 29 is arranged on exterior surfaces of the substrates, or an upper surface of the second transparent substrate 13 and a lower surface of the first transparent substrate 12.

Pixels 5 and 6 are arranged at a predetermined pitch on a surface contacting the liquid crystal layer 14 of the first transparent substrate 12. Each pixel 5 and 6 includes a scanning line 15, a signal line 16, a pixel electrode 17, a TFT 18 or a driving portion, an auxiliary capacitor 19 and an auxiliary capacitor line 20, as shown in the equivalent circuit diagram of FIG. 4B.

The TFT 18 functioning as a switch element is arranged in the vicinity of an intersection of the scanning line 15 and the signal line 16. A gate electrode of the TFT 18 is connected to the scanning line 15, a source electrode (or a drain electrode) thereof is connected to the signal line 16, and the drain electrode (or the source electrode) thereof is connected to the pixel electrode 17.

The auxiliary capacitor 19 for holding a charge is connected in series with the pixel electrode 17. The auxiliary capacitor 19 produces a capacity Cs between the pixel electrode 17 and the auxiliary capacitor line 20. A constant voltage is applied to the auxiliary capacitor 19 from an external control circuit (not shown).

Figure 4B:
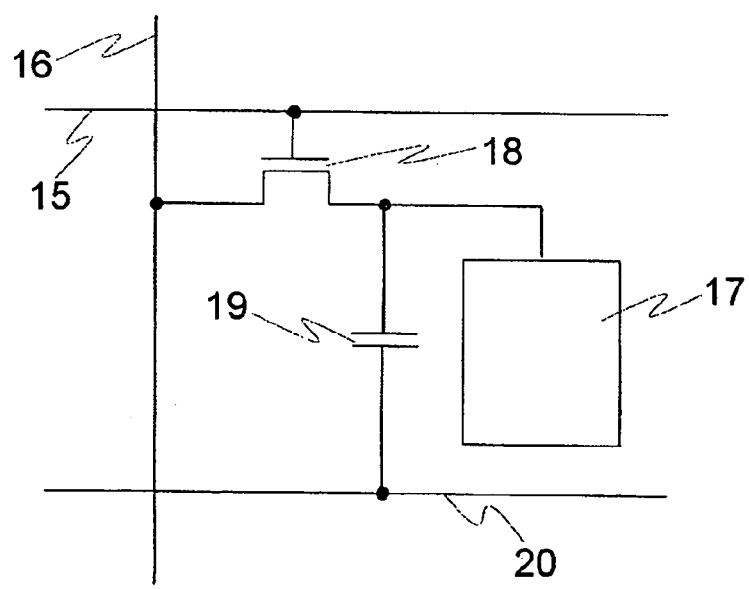
FIG. 4B is an equivalent circuit diagram of a display pixel of the liquid crystal panel.

Operation of the circuit of FIG. 4B will now be described.

When image data is output to the signal line 16, and a row selecting pulse signal is output to the scanning line 15 in synchronization therewith, the source-drain of the TFT becomes conductive. The image data is then written from the signal line 16 via the TFT 18 to the pixel electrode 17. A voltage corresponding to the provided image data is applied to each pixel electrode 17. The pixel electrode 17 applied with the voltage drives the liquid crystal layer 14 facing thereto. The display image as a whole is thereby formed.

An ITO (indium tin oxide) electrode 21 serving as a common electrode is formed on a surface contacting the liquid crystal layer 14 of the second transparent substrate 13 so as to face the pixel electrodes 17.

The organic electroluminescence device 8 includes a glass substrate 22, and partitions (spacers) 25 arranged on the glass substrate 22 at the same pitch as that of the pixels 5 and 6 of the liquid crystal panel 9. A transparent electrode 23 made of ITO (indium tin oxide) and an organic layer 26 including a light-emitting layer are stacked one over the other in each partition formed between the partitions 25. A metal electrode 24 is stacked on the organic layer 26. The transparent electrode 23, the organic layer 26, and the metal electrode 24 form a plurality of strip-shaped light-emitting regions 2 and 3. The number of the light-emitting regions 2 and 3 is greater than the number of pixels in the horizontal direction of the liquid crystal panel 9.

Figure 3A:
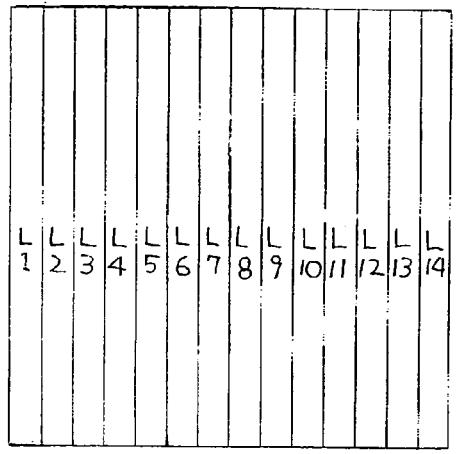
FIGS. 3A and 3B are diagrams each showing a left eye image and a right eye image according to the first, a second and a third embodiment of the present invention.
Figure 3B:
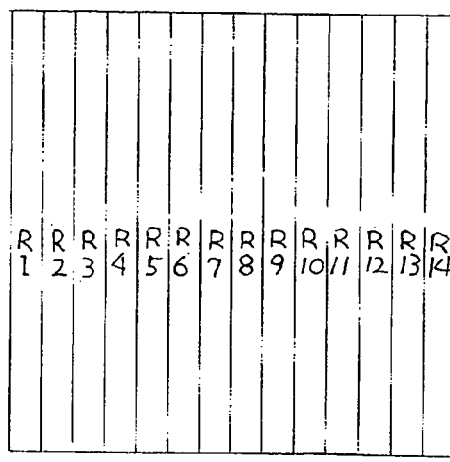

The image signal output section 10 includes an information processor, such as a micro-computer, and provides a left eye image and a right eye image to the liquid crystal panel 9, as shown in FIGS. 3A and 3B. More specifically, the image signal output section 10 equally divides each of the left eye image and the right eye image into a plurality of strip-shaped divided images, and provides the image data of each divided image to the relevant pixel (pixel column) 5 or 6. The image signal output section 10 provides the image data for displaying one of either the left eye image or the right eye image to pixel 5, and provides the image data for displaying the other image, different from that of pixel 5, to pixel 6. Further, the image signal output section 10 provides the image data to pixels 5 and 6 so that the left eye image and the right eye image are alternately displayed for every predetermined cycle. Thus, the left eye image and the right eye image appear in alternate shifts at a plurality of positions (positions A, B of FIG. 1) spaced apart in the horizontal direction at the front of the liquid crystal panel 9. The observer recognizes this alternating display as the stereoscopic image.

Figure 3C:
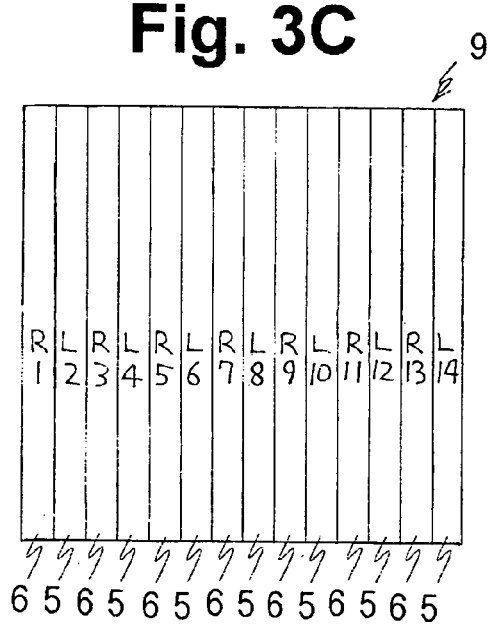
FIGS. 3C and 3D are diagrams showing two images alternately displayed on the liquid crystal panel.

The left eye divided images (L1, L2, ..., L14), as shown in FIG. 3A, and the right eye divided images (R1, R2, ..., R14), as shown in FIG. 3B, both of which are divided in the horizontal direction of the liquid crystal panel 9, are given as an example. The image signal output section 10 provides, as shown in FIG. 3C, the image data of the left eye divided images (L2, L4, ..., L14) in even columns to pixel 5, and the image data of the right eye divided images (R1, R3, ..., R13) in odd columns to pixel 6.

Figure 3D:
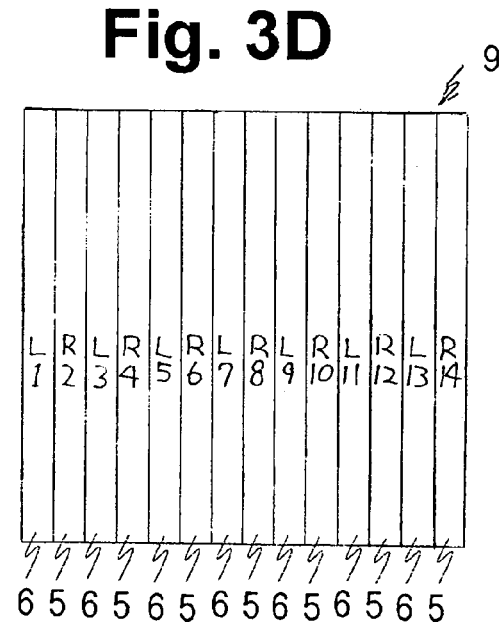

The image signal output section 10 then provides the image data of the right eye divided images (R2, R4, ..., R14) in even columns to pixel 5, and the image data of the left eye divided images (L1, L3, ..., L13) in odd columns to pixel 6, as shown in FIG. 3D. The image signal output section 10 thus outputs the image data shown in FIG. 3C and the image data shown in FIG. 3D at a predetermined cycle.

The light-emission control section 11 includes a logic circuit for controlling, for example, the switching of each light-emitting region 2 and 3 of the organic electroluminescence device 8, and a driving circuit for applying a predetermined driving voltage to each light-emitting region 2 and 3. The light-emission control section 11 switches emission every two light-emitting regions in the horizontal direction of the liquid crystal panel 9. When, for instance, the light-emitting region 2 is switched to emission (hereinafter "emit" or "emitted"), the light-emitting region 3 is simultaneously switched to non-emission (hereinafter "non-emit" or "non-emitted"). On the other hand, when the light-emitting region 3 is emitted, the light-emitting region 2 is simultaneously non-emitted. The operation of alternately switching the emission of the light-emitting regions 2 or 3 is carried out in synchronization with the switching of the display image of the liquid crystal panel 9.

The functions of the transmissive liquid crystal display unit 1 configured as above will now be described with reference to FIGS. 1 to 3.

The light-emission control section 11 applies the voltage between the electrodes of the organic electroluminescence device 8, causing a white light to emit from the organic layer 26 of the light-emitting region 2, which light exits toward the liquid crystal panel 9.

The light entering the liquid crystal panel 9 passes through each pixel 5 and 6 of the liquid crystal panel 9.

The image signal output section 10 provides the image data of the left eye divided image (L2, L4, ..., L14) in even columns to a plurality of pixels 5 and the image data of the right eye divided images (R1, R3, ..., R13) of the image in odd columns to a plurality of pixels 6. The pixels 5 and 6 thus display respective images. As shown in FIG. 1, at position A in front of the transmissive liquid crystal display unit 1, each pixel 6 displaying the right eye image and each emitted light-emitting region 2 appear as if overlapping one another. Therefore, when the right eye of the observer in front of the transmissive liquid crystal display unit 1 is at position A, the observer recognizes the right eye image including the right eye divided images (R1, R3, . . . , R13) as the entire liquid crystal panel 9. However, since each pixel 5 displaying the left eye image is positioned in front of the non-emitted light-emitting region 3 at position A, the left eye image can not be seen.

Similarly, at position B, each pixel 5 displaying the left eye image and each emitted light-emitting region 2 appears as if overlapping one another. Therefore, when the left eye of the observer in front of the transmissive liquid crystal display unit 1 is at position B, the observer recognizes the left eye image including the left eye divided images (L2, L4, . . . , L14) as the entire liquid crystal panel 9. However, since each pixel 6 displaying the right eye image is positioned in front of the non-emitted light-emitting region 3 at position B, the right eye image can not be seen.

Figure 2:
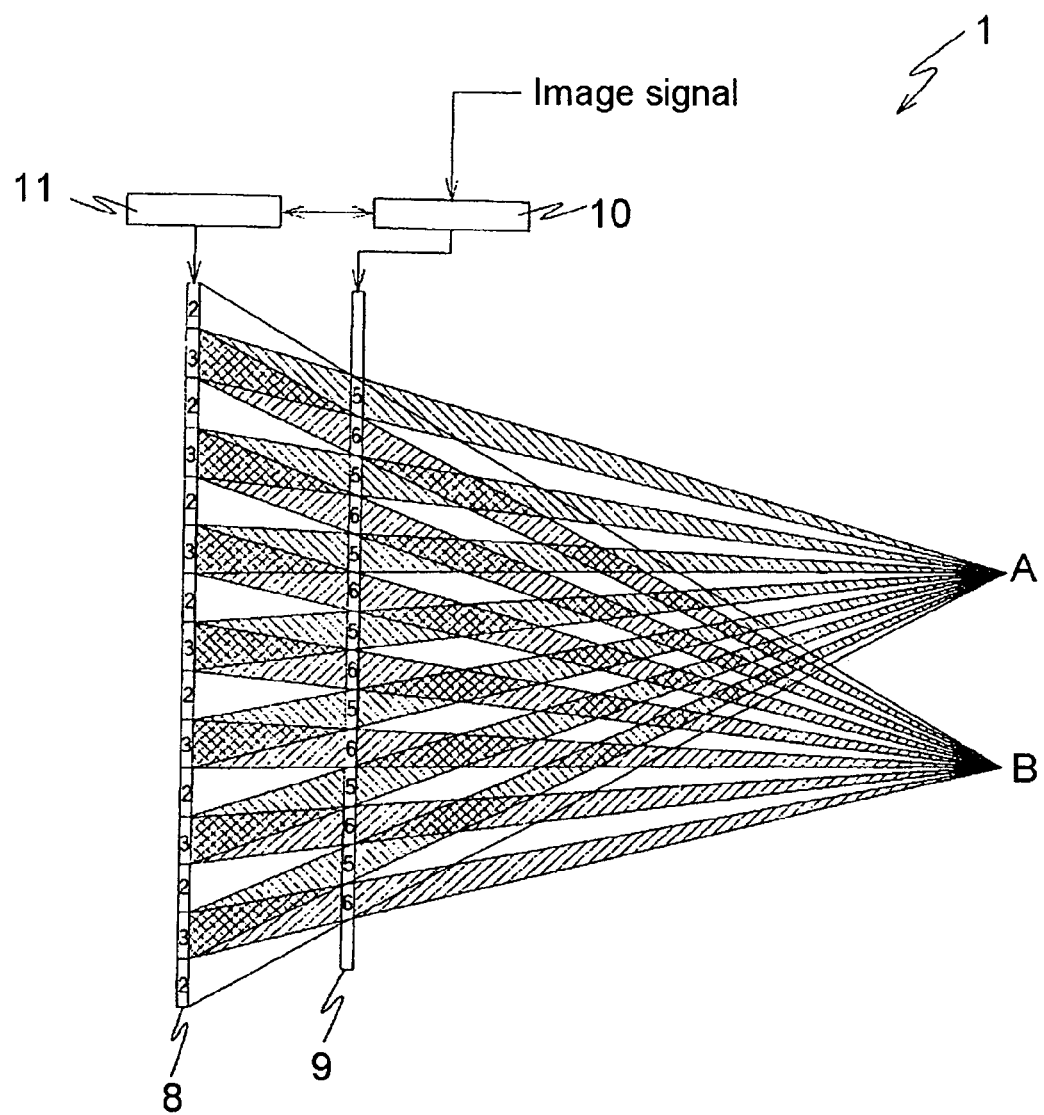

As shown in FIG. 2, the light-emitting region 2 is non-emitted and the light-emitting region 3 is emitted by the light-emission control section 11 operating in conjunction with the image signal output section 10.

In synchronization therewith, the image signal output section 10 provides the right eye divided images (R2, R4, . . . , R14) in even columns to each pixel 5, displaying the left eye image before switching, and provides the left eye divided images (L1, L3, . . . , L13) in odd columns to each pixel 6, displaying the right eye image before switching.

Therefore, at position A where the right eye image is seen with the light-emitting region 2 and the pixel 6 before switching, the right eye image including the right eye divided images (R2, R4, . . . , R14) in even columns is recognized with the light-emitting region 3 and the pixel 5 after switching. Similarly, after switching, the left eye image including the left eye divided images (L1, L3, . . . , L13) in odd columns is recognized with the light-emitting region 3 and the pixel 6 at position B.

By repeating the switching of the images at each pixel 5 and 6 and the switching of the light-emitting regions in a short cycle, the image displayed before switching and the image displayed after switching overlap one another, and thus the observer recognizes the images as one image (three-dimensional image or stereoscopic image). Since all of the pixels 5 and 6 of the liquid crystal panel 9 contribute to displaying two images, a three-dimensional image is displayed without any lowering of horizontal resolution even when compared to the image observed when a two-dimensional image is displayed on the relevant display unit.

The first embodiment has the following advantages.

(1) At a specific position A (B) in front of the display unit, the pixel 5 (6) appears as if overlapping the emitted light-emitting region 3 (2), but the pixel 6 (5) does not appear as if overlapping the non-emitted light-emitting region 2 (3). Therefore, two images are simultaneously displayed as if separately seen at different positions (A, B) without using an optical directivity member, such as a lenticular lens and a parallax barrier. Further, a three-dimensional image is displayed without any lowering of horizontal resolution even when compared to the image observed when a two-dimensional image is displayed on the relevant display unit.

(2) A light source includes a greater number of light-emitting regions than the number of pixels in the horizontal direction of the liquid crystal panel. Therefore, all of the pixels of the liquid crystal are used to display two alternately displayed images. The number of positions A and B where the pixel and the relevant light-emitting region appear as if overlapping one another is not limited to one, and a plurality of positions may exist in the horizontal direction at the front of the display unit. Thus, an observer at a position in the diagonal direction other than at the front of the display unit (e.g., position closer to the sides of the liquid crystal panel 9 than position A) may also see the three-dimensional imagery in the same way as the observer in front of the display unit. However, if the number of light-emitting regions is equal to or less than the number of pixels in the horizontal direction, the light from the vicinity of the edges of the light source in the horizontal direction transmitted through the pixels at the left end or the right end of the screen becomes hidden as the position shifts in the horizontal direction from the position in front of the display unit, and thus the left end or the right end of the screen of the display unit will be cut off. In this case, by setting the number of light-emitting regions greater than the number of pixels in the horizontal direction of the display unit, the observer looking from the diagonal direction will also recognize the display of all the pixels and the display screen will not be narrowed.

(3) Since each light-emitting region is formed for every micro-partition and thus can be made small due to the fact that the light source is an organic electroluminescence device, and the three-dimensional image is displayed without any lowering of resolution. Further, by setting the speed of response of the electroluminescence device faster, the three-dimensional image is stably displayed without any lowering of resolution.

Figure 5:
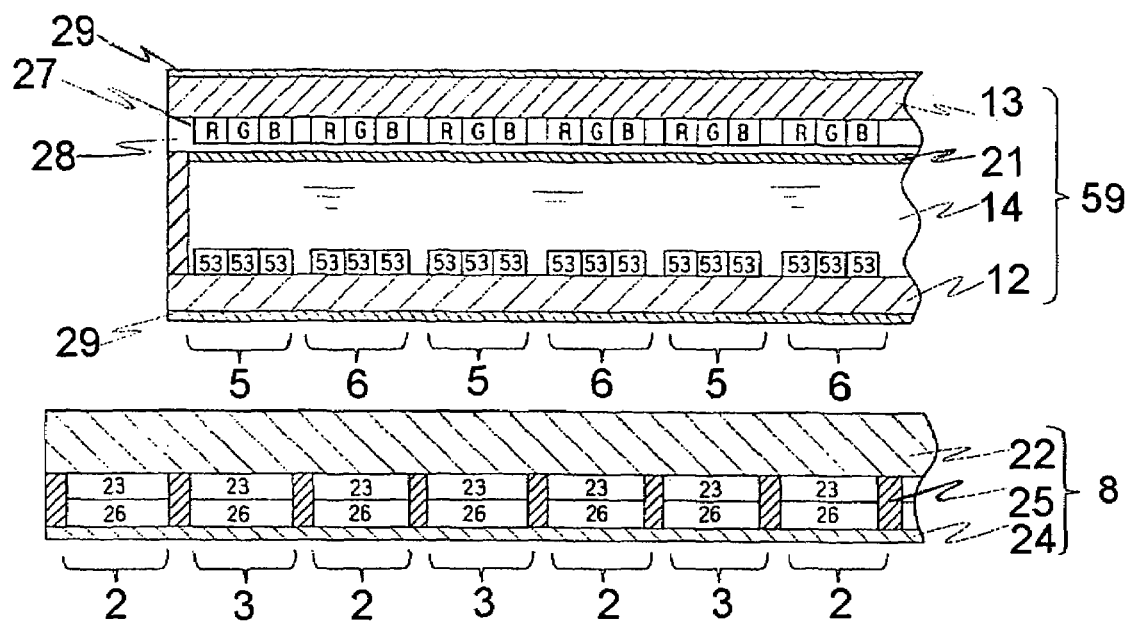
FIG. 5 is a partial sectional view of the transmissive liquid crystal display unit according to the second embodiment of the present invention.
Figure 6:
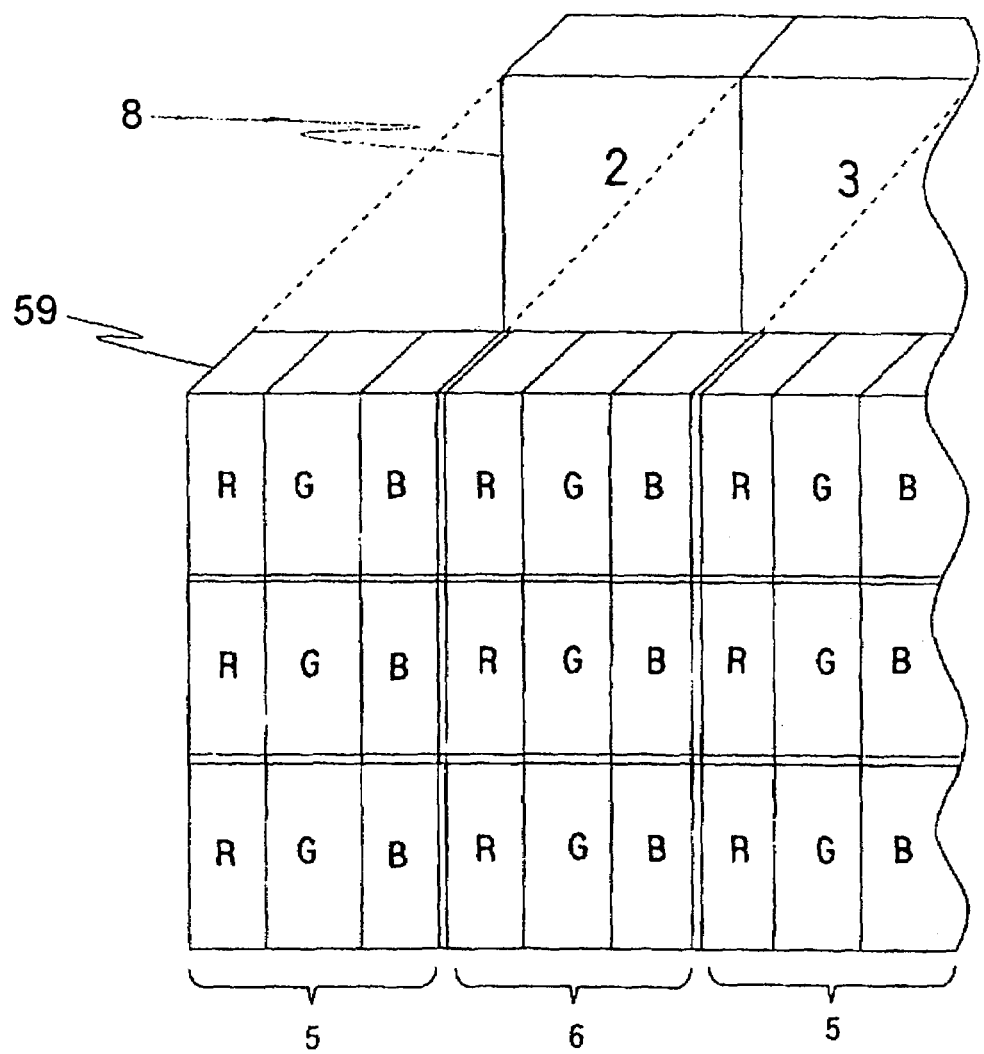
FIG. 6 is a partial perspective view of the transmissive liquid crystal display unit of FIG. 5.

A display unit according to a second embodiment of the present invention will now be described. The liquid crystal panel 59 of the second embodiment includes a color filter 27, a protective film 28, and an ITO electrode 21 functioning as a common electrode stacked one over the other between the second transparent substrate 14 and the liquid crystal layer 14, as shown in FIG. 5. A pixel electrode 53, and a sub-pixel (not shown) including a scanning line, a signal line, a TFT, an auxiliary capacitor and an auxiliary capacitor line are arranged on a surface contacting the liquid crystal layer 14 of the first transparent substrate 12 so that one pixel displays three colors of R, G, and B. One pixel includes three pixel electrodes 53 aligned in the horizontal direction of the liquid crystal panel. The color filter 27 is formed so that R, G, and B are displayed side-by-side in the horizontal direction of the liquid crystal panel 59 in the pixel, as shown in FIG. 6.

The second embodiment has, in addition to the above mentioned advantages (1) to (3), the following advantages.

A color three-dimensional image may be displayed without using an optical directivity member. Further, an existing liquid crystal panel may be used.

Figure 7:
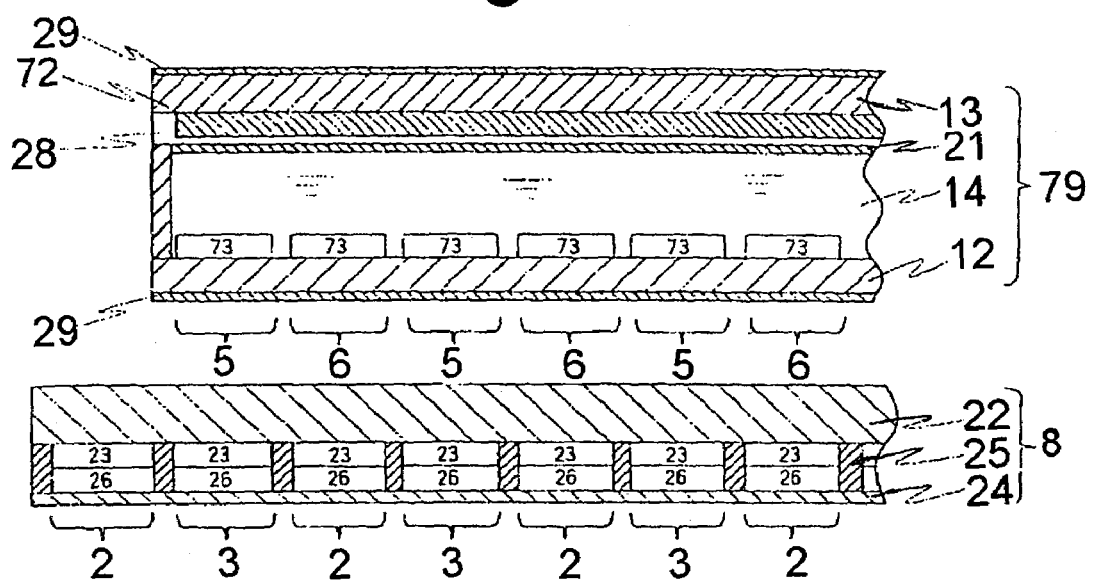
FIG. 7 is a partial sectional view of the transmissive liquid crystal display unit according to the third embodiment of the present invention.
Figure 8:
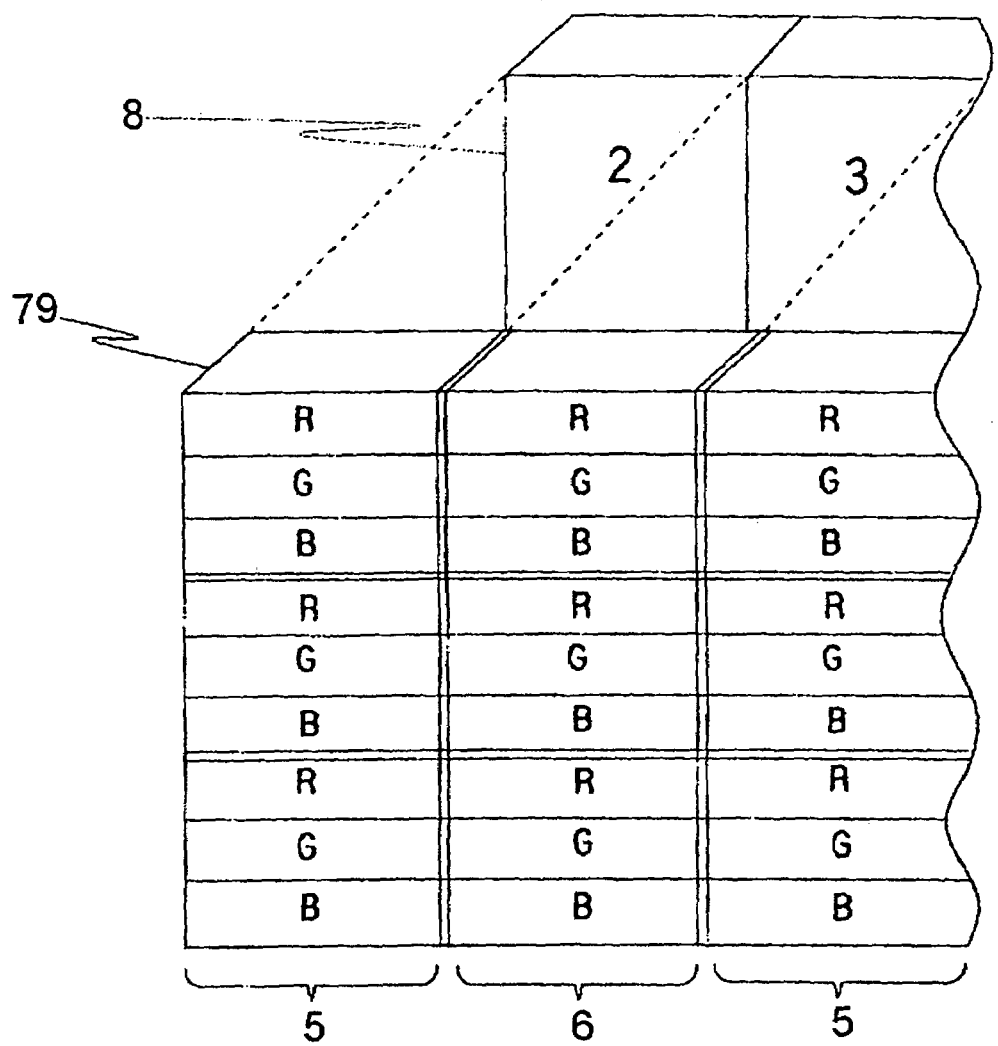
FIG. 8 is a partial perspective view of the transmissive liquid crystal display unit of FIG. 7.

A display unit according to a third embodiment of the present invention will now be described. The liquid crystal panel 79 of the third embodiment includes a color filter 72, a protective film 28, and an ITO electrode 21 functioning as a common electrode in between the second transparent substrate 13 and the liquid crystal layer 14, as shown in FIG. 7. A pixel electrode 73, and three sub-pixels (not shown) including a scanning line, a signal line, a TFT, an auxiliary capacitor and an auxiliary capacitor line are arranged on a surface contacting the liquid crystal layer 14 of the first transparent substrate 12, which pixel electrodes and three sub-pixels are aligned in the vertical direction of the liquid crystal panel so that one pixel displays three colors of R, G, and B. The color filter 72 includes three partitions formed so that the R, G, and B are displayed side-by-side in the vertical direction of the liquid crystal panel 79 in the pixel, as shown in FIG. 8. The other features of the configuration are the same as that of the first embodiment.

According to the third embodiment, a plurality of color images is displayed each at a different position without using an optical directivity member. Further, each sub-pixel aligned in the vertical direction in each pixel receives substantially an equal amount of light from the light-emitting region aligned in the horizontal direction, and thus the chromaticity of the image displayed by the emitted light-emitting region does not change.

A transmissive liquid crystal display unit for displaying a plurality of images according to a fourth embodiment of the present invention will now be described with reference to FIGS. 9 to 13.

Figure 9:
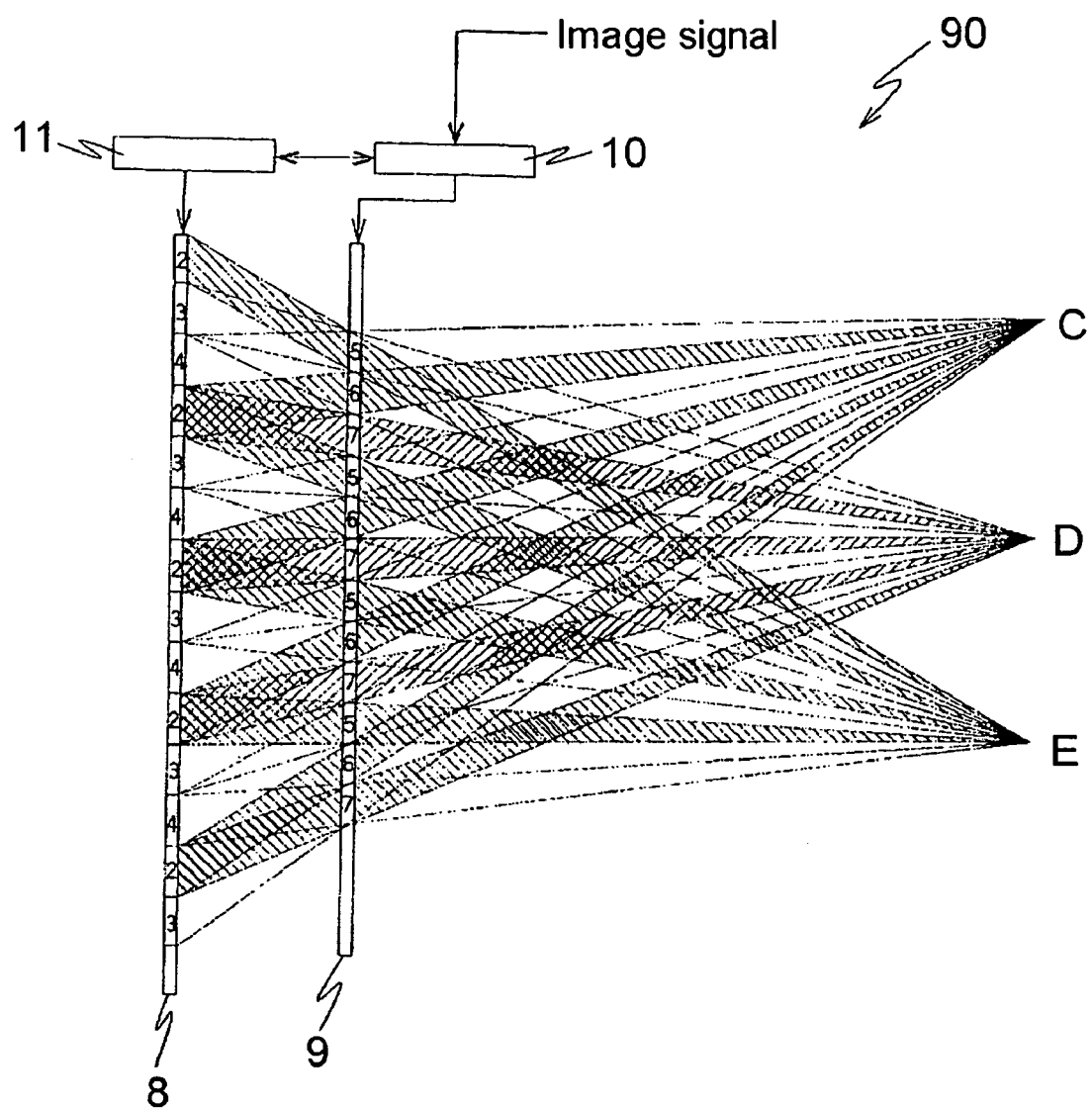
FIGS. 9 to 11 are diagrams showing light path switching of the transmissive liquid crystal display unit according to a fourth embodiment of the present invention.

FIG. 9 shows a transmissive liquid crystal display unit 90 for displaying three different images α, β, and γ. The images α, β, and γ are for example, images with continuous parallax with respect to each other.

The image signal output section 10 includes an information processor, such as a micro-computer. The image signal output section 10 generates image data for displaying one of the images α, β, and γ at pixel 5, image data for displaying an image different from pixels 5 and 7 at pixel 6, and image data for displaying an image different from pixels 5 and 6 at pixel 7 from the image signal provided from the external circuit, and provides such image data to the liquid crystal panel 9. Thus, three different images α, β, and γ are displayed by the pixels 5, 6, and 7 successively arranged in the horizontal direction of the liquid crystal panel 9. The image signal output section 10 provides the image data of three images α, β, and γ to the respective pixels 5, 6, and 7 for every predetermined period so that images α, β, and γ are counter-changeably displayed for every predetermined period.

Figure 12A:
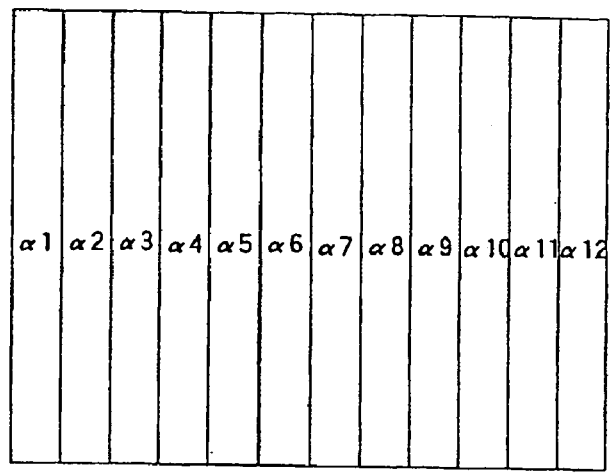
FIGS. 12A to 12C are diagrams each showing three different types of images.
Figure 12B:
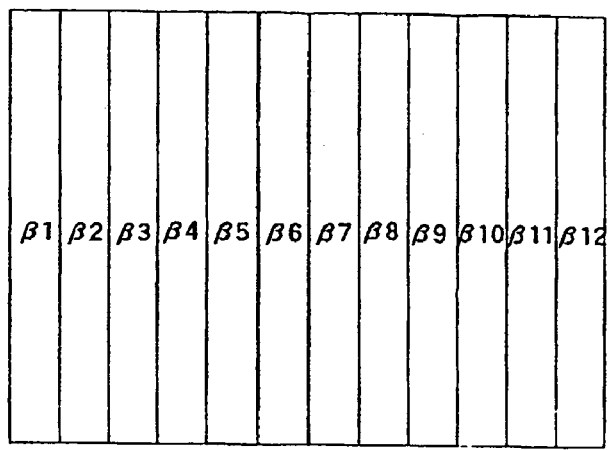
Figure 12C:
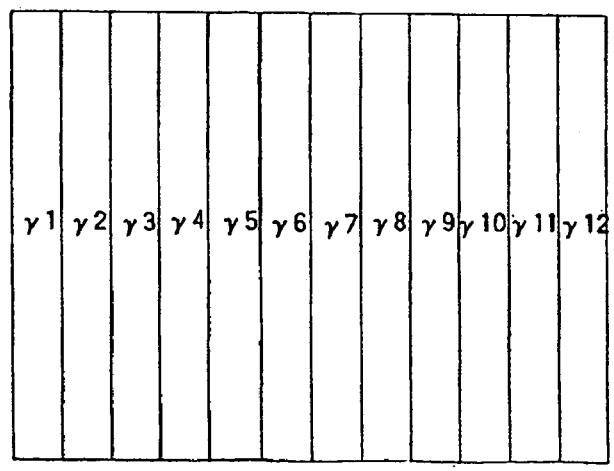
Figure 13A:
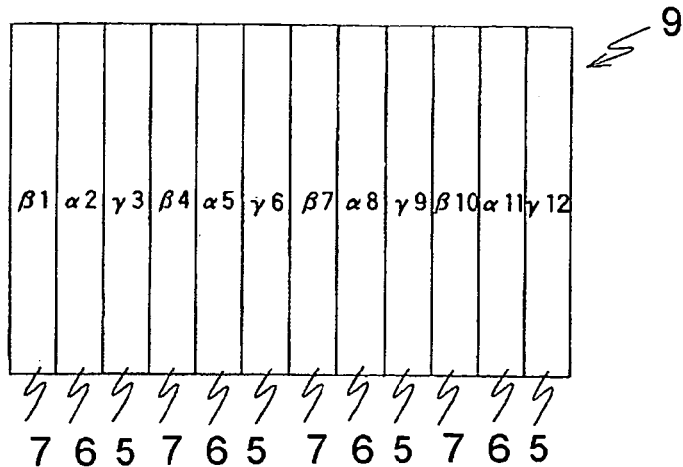
FIGS. 13A to 13C are diagrams each showing three images alternately displayed on the liquid crystal panel.

More specifically, the image signal output section 10 prepares α divided images (α1, α2, . . . , α12), as shown in FIG. 12A, β divided images (β1, β2, . . . , β12), as shown in FIG. 12B, and γ divided images (γ1, γ2, . . . , γ12), as shown in FIG. 12C, equally divided in the horizontal direction of the liquid crystal panel 9. The image signal output section 10 provides image data of the γ divided images including γ3, γ6, γ9, γ12 to pixel 5, image data of α divided images including α2, α5, α8, all to pixel 6, image data of β divided images including β1, β4, β7, β10 to pixel 7, as shown in FIG. 13A.

Figure 13B:
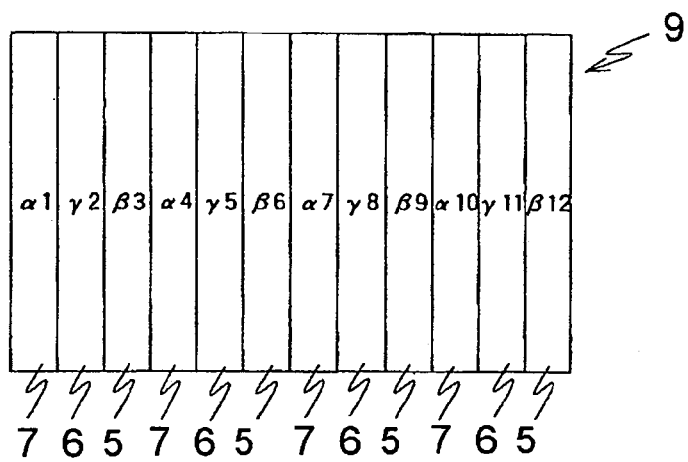

As shown in FIG. 13B, after a predetermined cycle period, the image signal output section 10 provides image data of β divided images including β3, β6, β9, β12 to pixel 5, image data of γ divided images including γ2, γ5, γ8, γ11 to pixel 6, and image data of α divided images including α1, α4, α7, α10 to pixel 7, as shown in FIG. 13B.

Figure 13C:
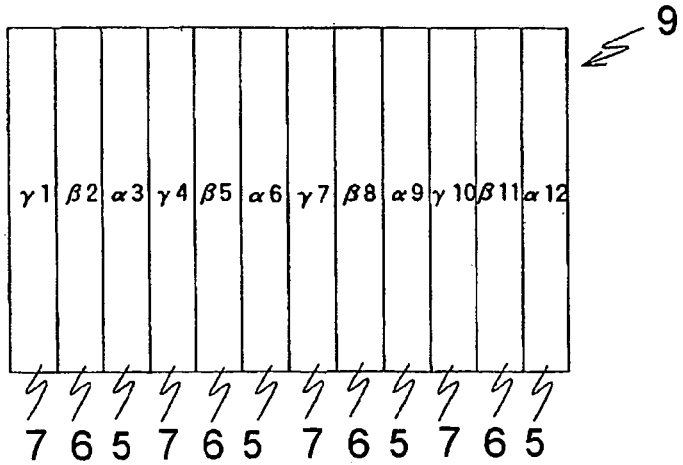

After another further predetermined cycle period, the image signal output section 10 provides image data of α divided images including α3, α6, α9, α12 to pixel 5, image data of β divided images including β2, β5, β8, β11 to pixel 6, image data of γ divided images including γ1, γ4, γ7, γ10 to pixel 7, as shown in FIG. 13C.

The light-emission control section 11 includes a logic circuit for controlling the light-emitting regions 2, 3, and 4 of the organic electroluminescence device 8, and a driving circuit for applying a predetermined driving voltage to the light-emitting regions 2, 3, and 4. In the horizontal direction of the liquid crystal panel 9, the light-emission control section 11 emits every three light-emitting regions. The light-emission control section 11 controls the organic electroluminescence device 8 so that, for example, when the light-emitting region 2 is emitted, the light-emitting regions 3 and 4 are simultaneously non-emitted, when the light-emitting region 3 is emitted, the light-emitting regions 2 and 4 are simultaneously non-emitted, and when the light-emitting region 4 is emitted, the light-emitting regions 2 and 3 are simultaneously non-emitted. The operations of the light-emitting regions 2, 3, and 4 are performed in synchronization with the switching of the display image of the liquid crystal panel 9.

Other features of the fourth embodiment are the same as those of the first embodiment.

The function of the transmissive liquid crystal display unit 90 will now be described with reference to FIGS. 9 to 11.

The transmissive liquid crystal display unit 90 drives the following steps S1, S2 and S3 as one cycle. The multiple stereoscopic image is displayed without any lowering of horizontal resolution even when compared to the image observed when the two-dimensional image is displayed on the transmissive liquid crystal display unit 90.

(Step S1)

As shown in FIG. 9, the light-emission control section 11 simultaneously emits the light-emitting region 2.

In synchronization with such light-emission, the image signal output section 10 provides the image data of the γ divided images including γ3, γ6, γ9, γ12 to pixel 5, the image data of the α divided images including α2, α5, α8, α11 to pixel 6, the image data of β divided images including β1, β4, β7, β10 to pixel 7. The image shown in FIG. 13A is thus displayed on the liquid crystal panel 9. At position E in front of the transmissive liquid crystal display unit 90, each pixel 5 displaying the image γ and each emitted light-emitting region 2 appear as if overlapping one another. Therefore, the observer at position E recognizes the image γ including γ3, γ6, γ9, γ12 as the entire liquid crystal 9. However, since each pixel 6 displaying the image α and each pixel 7 displaying the image β are positioned in front of the non-emitted light-emitting regions 3 and 4 at position E, light that passes through the pixels 6 and 7 can not be seen.

Similarly, at position C where each pixel 6 displaying the image α and each emitted light-emitting region 2 appear as if overlapping one another, the image α including α2, α5, α6, α11 can only be seen, and at position D where each pixel 7 displaying the image β and each emitted light-emitting region 2 appear as if overlapping one another, the image β including β1, β4, β7, β10 can only be seen.

(Step S2)

Figure 10:
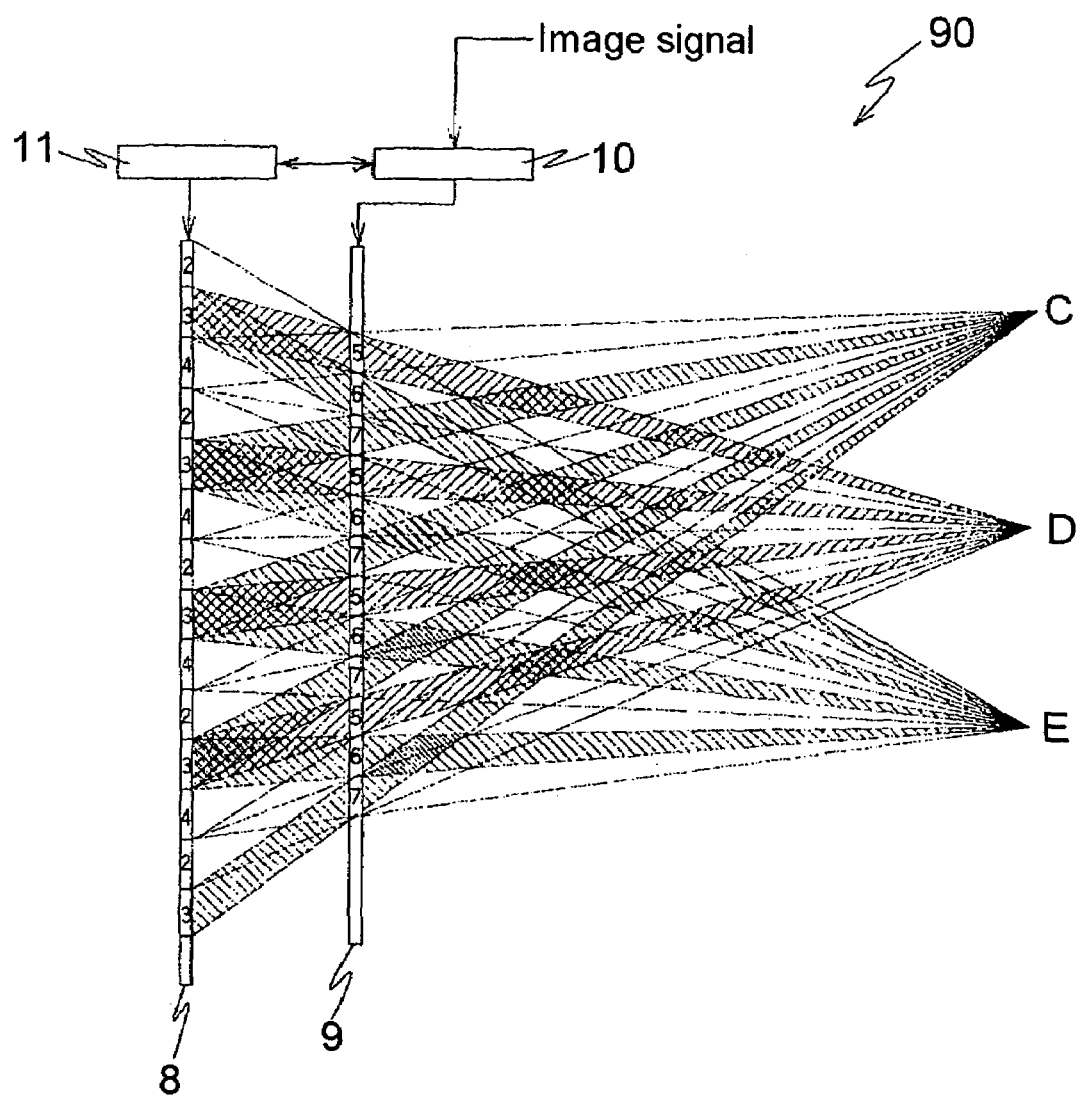

The light-emission control section 11 does not emit the light-emitting regions 2 and 4 but emits the light-emitting region 3, as shown in FIG. 10.

In synchronization with such light-emission, the image signal output section 10 provides the image data of the image β including β3, β6, β9, β12 to pixel 5, displaying the image γ in step S1, provides the image data of the image γ including γ2, γ5, γ8, γ11 to each pixel 6, displaying the image α in step S1, and provides the image data of the image α including α1, α4, α7, α10 to each pixel 7, displaying the image β in step S1. The image shown in FIG. 13B is thus displayed on the liquid crystal panel 9. At position C where the image α is recognized with the light-emitting region 2 and the pixel 6 in step S1, the observer now recognizes the image α including α1, α4, α7, α10 with the light-emitting region 3 and the pixel 7. Similarly, at position D where the image β is recognized in step S, the observer now recognizes the image β including β3, β6, β9, β12 with the light-emitting region 3 and the pixel 5 in step S2. Further, at position E where the image γ is recognized in step S1, the observer now recognizes the image γ including γ2, γ5, γ8, γ11 with the light-emitting region 3 and the pixel 6 in step S2.

(Step S3)

Figure 11:
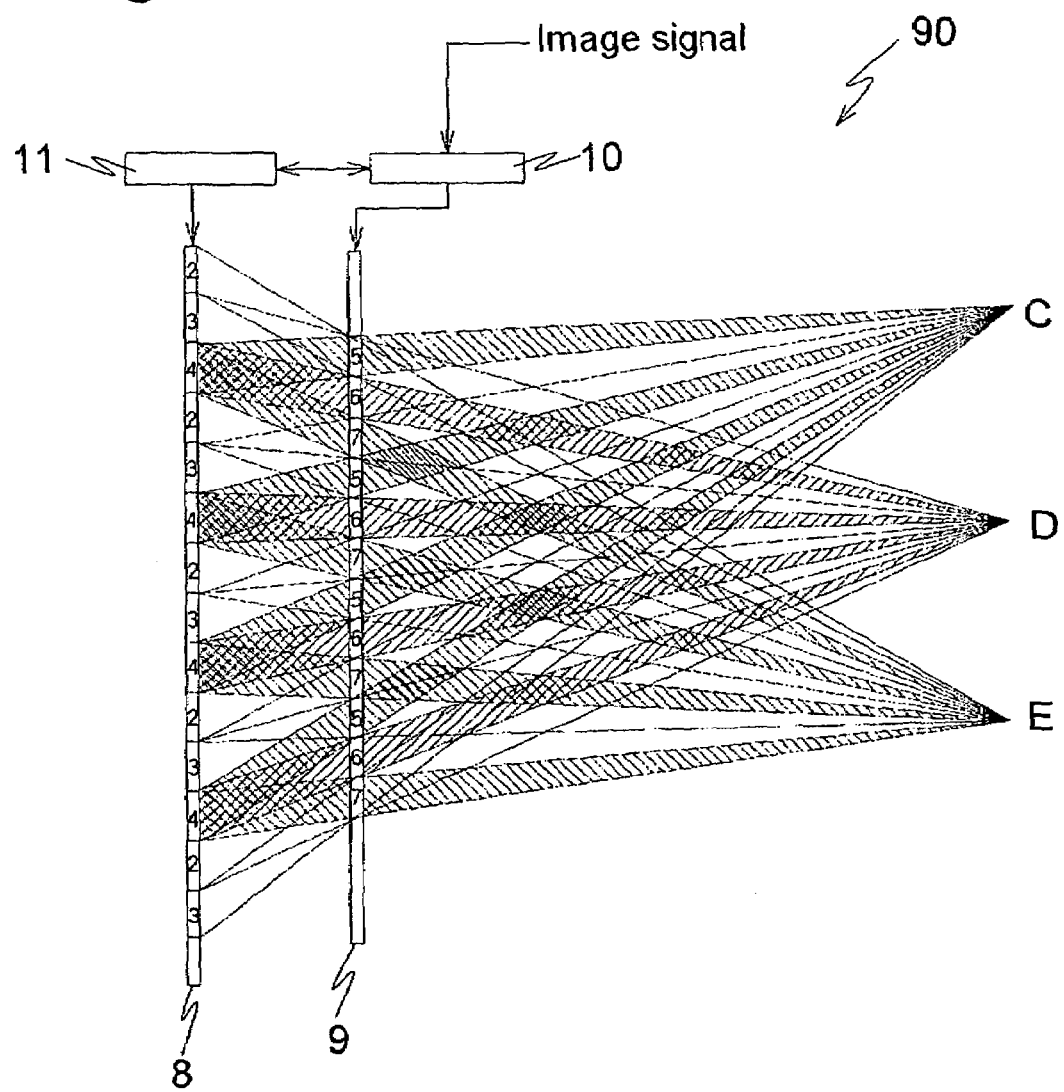

As shown in FIG. 11, the light-emission control section 11 does not emit the light-emitting regions 2 and 3 but emits the light-emitting region 4.

In synchronization with such light-emission, the image signal output section 10 provides the image data of the image α including α3, α6, α9, α12 to each pixel 5, displaying the image β in step S2, provides the image data of the image β including β2, β5, β8, β11 to each pixel 6, displaying the image γ in step S2, and provides the image data of the image γ including γ1, γ4, γ7, γ10 to each pixel 7, displaying the image α in step S2. The image shown in FIG. 13C is thus displayed on the liquid crystal panel 9. At position C where the image α is recognized with the light-emitting region 3 and the pixel 7 in step S2, the observer now recognizes the image α including α3, α6, α9, α12 with the light-emitting region 4 and the pixel 5. Similarly, at position D where the image β is recognized in step S2, the image β including β2, β5, β8, β11 is now recognized with the light-emitting region 4 and the pixel 6 in step S3. Further, at position E where the image γ is recognized in step S2, the image γ including γ1, γ4, γ7, γ10 is now recognized with the light-emitting region 4 and the pixel 7 in step S3.

By repeating the cycles of Step S1 to S3 in a short cycle, the observer at each position of C, D, and E recognizes this as if simultaneously looking at the image displayed in step S1, the image displayed in step S2, and the image displayed in step S3.

Since a plurality of images are displayed using all of the pixels 5, 6, and 7 of the liquid crystal panel 9, the multiple stereoscopic image is displayed without any lowering of horizontal resolution even when compared to an image observed when a corresponding two-dimensional image is displayed on the display unit 90.

Further, in the present embodiment, by increasing the number of pixels n, the stereoscopic image may be displayed as if the observer is surrounded by the stereoscopic image.

The first to the fourth embodiments may be modified as described below.

The light-emission control section 11 and the image signal output section 10 may be integrally or separately included. A single controlling computer 1a (refer to FIG. 1), for example, having the functions of the light-emission control section 11 and the image signal output section 10 may be used. The light-emission control section 11 and the image signal output section 10, or the relevant controlling computer 1a may be configured so as to operate in accordance with a pre-installed control program.

In each embodiment, a planar organic electroluminescence device is used, but the present invention is not limited thereto, and the planar light-emitting device, such as an inorganic electroluminescence device, may also be used. Similar advantages as recognized in each embodiment are also obtained in such cases.

Figure 14:
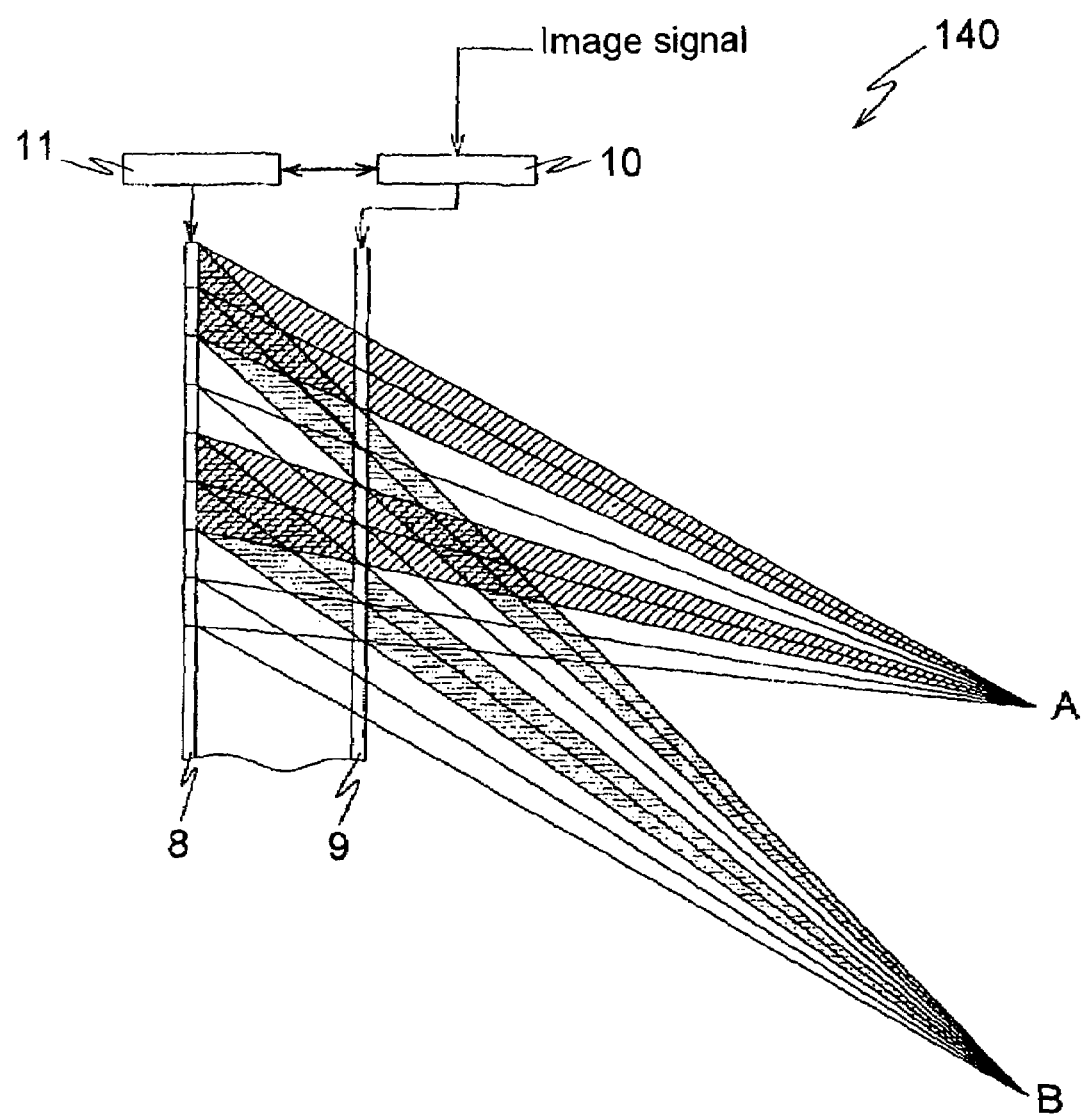
FIG. 14 is a cross sectional view of a transmissive liquid crystal display unit of another embodiment.

In the first to the third embodiments, a plurality of light-emitting regions is controlled so as to be emitted for every predetermined number of light-emitting regions in the horizontal direction of the liquid crystal panel. However, the present invention is not limited thereto, and as shown in FIG. 14, the light-emitting regions may be controlled so that a plurality of emitted light-emitting regions and a plurality of non-emitted light-emitting regions are successively displayed in alternating shifts in the horizontal direction of the liquid crystal by emitting a plurality of light-emitting regions and at the same time non-emitting a plurality of consecutive light-emitting regions. In this case, however, as shown in FIG. 14, image data provided to each pixel of the liquid crystal panel must also be output so that the right eye image and the left eye image are successively displayed in an alternating manner for every plurality of pixels.

In each embodiment, the image data provided to each pixel of the liquid crystal panel before and after switching is an image signal externally provided directly to the image signal output section 10, but the image data after switching may be the image data obtained from the image data provided before switching using the well known information arithmetic technique. The information processing technique is a technique that, for example, combines two image data output to pixels on both sides of an arbitrary pixel in the horizontal direction before switching of the emission and non-emission of the light-emitting region, and that by, for example, deriving a mean value, artificially generates intermediate image data (e.g., data for an intermediate image of the right and left eye images) of the relevant two images.

In each embodiment, a light source including a light-emitting region greater in number than the pixel of the liquid crystal panel in the horizontal direction is used, but the present invention is not limited thereto, and the number of light-emitting regions may be changed in accordance with the application. In such a configuration as well, a plurality of different images is displayed without using an optical directivity member, and a plurality of images is displayed without any lowering of horizontal resolution even when compared to a two-dimensional image displayed on the relevant display unit. However, if the light source in which the number of the light-emitting regions is equal to or less by an even number than the number of pixels in the horizontal direction of the liquid crystal panel, the resolution differs between the two display images.

Figure 15:
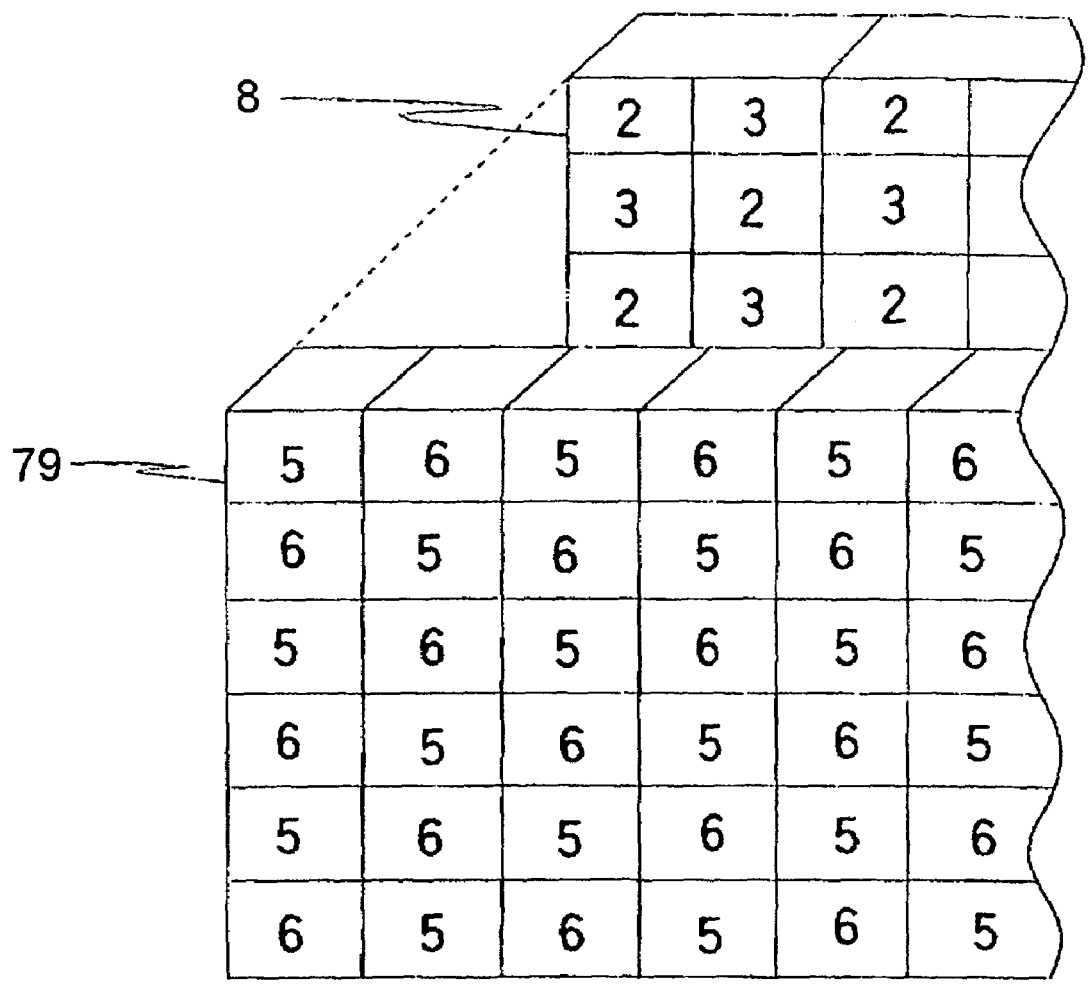
FIG. 15 is a perspective view of the transmissive liquid crystal display unit of FIG. 14.

In the first to the third embodiments, the image signal output section 10 outputs the image data so that the right eye image and the left eye image are alternately displayed in the horizontal direction of the liquid crystal panel, but the present invention is not limited thereto, and for example, as shown in FIG. 15, the image signal output section may output the image data so that the right eye image and the left eye image are alternately displayed for every pixel 5 and 6 not only in the horizontal direction of the liquid crystal panel 79 but also in the vertical direction of the liquid crystal panel 79. In this configuration as well, a plurality of different images is displayed without using an optical directivity member, and a plurality of images is displayed without any lowering of horizontal resolution even when compared to the two-dimensional image displayed on the relevant display unit. However, as shown in FIG. 15, the light source must also be divided not only in the horizontal direction of the liquid crystal panel, but also in the vertical direction.

Figure 16:
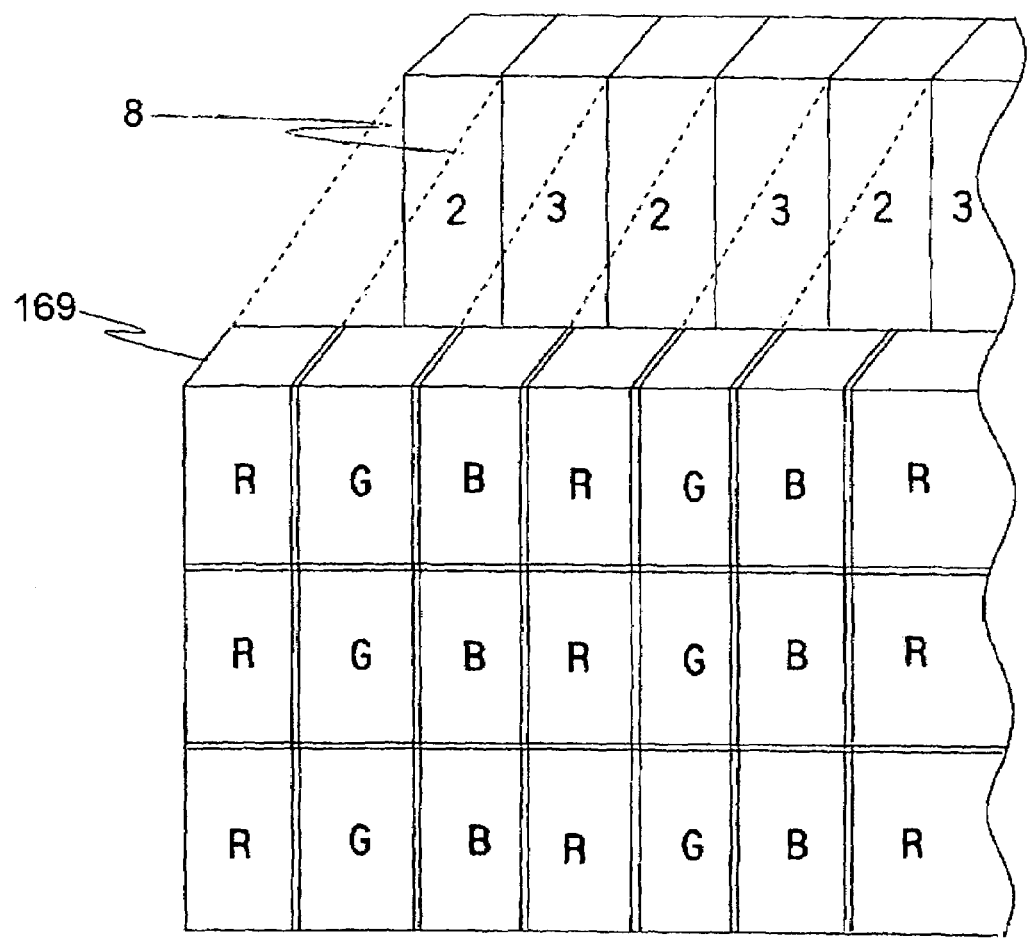
FIG. 16 is a perspective view of a transmissive liquid crystal display unit of another further embodiment.

In the second and the third embodiments, the liquid crystal panel is formed so that R, G, and B are displayed with the light from one light-emitting region, but the liquid crystal panel may be formed so that R, G, and B are displayed with the light from three light-emitting regions, as shown in FIG. 16.

In the first to the third embodiments, two different images are displayed and in the fourth embodiment, three different images are displayed, but the number of images to be displayed is not limited, and as long as the control is performed in a similar way as described in the embodiments, the multiple stereoscopic images is observed without any lowering of horizontal resolution.

In the second embodiment, two different color images are displayed, but the number of images to be displayed is not limited and, for example, by substituting the liquid crystal panel of the transmissive liquid crystal display unit of the fourth embodiment for the liquid crystal panel of the second or the third embodiment, three different color images may be displayed.

In each embodiment, a liquid crystal panel functioning as the transmissive image display panel is used, but a display panel using a material that selectively transmits the light, such as a PLZT (lead lanthanum zicronate titanate), may also be used.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A display unit having the horizontal direction for displaying a plurality of images including a first image and a second image, the display unit comprising:
   a light source having a plurality of light-emitting regions;
   a transmissive image display panel for displaying an image when light from the light source is transmitted therethrough, the transmissive image display panel including a predetermined number of pixels in the horizontal direction, and being arranged spaced apart from and facing the light source so that light from each light-emitting region illuminates at least two pixels;
   a light-emission control section for controlling the light source, the light-emission control section emitting at least one first selected light-emitting region among the plurality of light-emitting regions and non-emitting at least one second selected light-emitting region among the light-emitting regions adjacent to the at least one first selected light-emitting region, the light-emission control section alternately switching emitting and non-emitting of the at least one first selected light-emitting region and the at least one second selected light-emitting region at a predetermined cycle; and
   an image signal output section connected to the display panel for providing data of the plurality of images to the plurality of pixels, wherein the image signal output section provides first image data for displaying the first image to at least one first pixel of the plurality of pixels, and provides second image data for displaying the second image to at least one second pixel of the plurality of pixels adjacent to the at least one first pixel, and wherein in synchronization with the switching of the emitting and non-emitting of each light-emitting region by the light-emission control section, the image signal output section alternately provides data of an image different from the image, displayed before switching of the emitting and non-emitting of the light-emitting region, to the at least one first pixel and the at least one second pixel, wherein in the horizontal direction of the transmissive image display panel, the light-emitting regions are arranged at the substantially same pitch as that of the pixels, and the light-emitting regions each have substantially the same width as that of each pixel, and wherein the number of the plurality of light-emitting regions in the horizontal direction is greater than that of the pixels.

2. The display unit according to claim 1, wherein when the first image and the second image are viewed by an observer with both eyes, the first and second images have a parallax between the left and right eyes.

3. The display unit according to claim 1, wherein each of the pixels displays one of red, green, or blue, and the transmissive image display panel displays a color image.

4. The display unit according to claim 1, wherein the transmissive image display panel is a transmissive image display panel for displaying a color image; and
   each pixel includes three partitions partitioned in a vertical direction of the transmissive image display panel, which three partitions display red, green, and blue.

5. The display unit according to claim 1, wherein the transmissive image display panel is a liquid crystal panel.

6. The display unit according to claim 1, wherein the transmissive image display panel is a PLZT (lead lanthanum zicronate titanate) panel.

7. The display unit according to claim 1, wherein the light source is an organic electroluminescence device.

8. The display unit according to claim 1, wherein the light source is planar.

9. The display unit according to claim 1, wherein the plurality of light-emitting regions is a plurality of strip-shaped regions parallel to each other.

10. The display unit according to claim 1, wherein the light source includes partitions for partitioning the light-emitting regions from each other.

11. The display unit according to claim 1, wherein the light source emits white light.

12. A display unit having a horizontal direction comprising:
   a light source having a plurality of parallel light-emitting regions arranged in the horizontal direction for emitting light;
   a transmissive image display panel for displaying an image when light from the light source is transmitted therethrough, the transmissive image display panel having a plurality of display positions arranged in the horizontal direction and each including a plurality of pixels;
   an image signal output section connected to the display panel, the image signal output section equally dividing each of a plurality of N images of a first to an Nth image to a plurality of divided images in which two successive images of the N images have a continuous parallax therebetween, the image signal output section generating image data so that the plurality of divided images of each of the N images is repeatedly displayed in a predetermined order at the plurality of display positions of the transmissive image display panel, respectively, and providing the image data to the plurality of pixels; and
   a light-emission control section for controlling the light source, the light-emission control section simultaneously emitting the light-emitting regions for every Nth light-emitting regions in the horizontal direction and switching the emitting and non-emitting of each light-emitting region at a predetermined cycle, wherein the transmissive image display panel is arranged spaced apart from and facing the light source so that light from each light-emitting region illuminates the pixels related to at least N divided images, and wherein in synchronization with the switching of the emitting and non-emitting of each light-emitting region by the light-emission control section, the image signal output section alternately provides data of a divided image, different from the divided image displayed before switching of the emitting and non-emitting of the light-emitting region, to each pixel, wherein in the horizontal direction, the light-emitting regions are arranged at the substantially same pitch as that of the pixels, and the light-emitting regions each have substantially the same width as that of each pixel, and wherein the number of the plurality of light-emitting regions in the horizontal direction is greater than that of the pixels.

13. The display unit according to claim 12, wherein each of the pixels displays one of red, green, or blue, and the transmissive image display panel displays a color image.

14. The display unit according to claim 12, wherein the transmissive image display panel is a transmissive image display panel for displaying a color image; and
   each pixel includes three partitions partitioned in a vertical direction of the transmissive image display panel, which three partitions display red, green, and blue.

15. The display unit according to claim 1 wherein the transmissive image display panel is a liquid crystal panel.

16. The display unit according to claim 12, wherein the transmissive image display panel is a PLZT (lead lanthanum zicronate titanate) panel.

17. The display unit according to claim 12, wherein the light source is an organic electroluminescence device.

18. The display unit according to claim 12, wherein the light source is planar.

19. The display unit according to claim 12, wherein the plurality of light-emitting regions is a plurality of strip-shaped regions parallel to each other.

20. The display unit according to claim 12, wherein the light source includes partitions for partitioning the light-emitting regions from each other.

21. The display unit according to claim 12, wherein the light source emits white light.

22. A display unit having a horizontal direction comprising:
   a light source having a plurality of parallel light-emitting regions arranged in the horizontal direction;
   a transmissive image display panel for displaying an image when light from the light source is transmitted therethrough, the transmissive image display panel having a plurality of display positions arranged in the horizontal direction and each including a plurality of pixels;
   an image signal output section connected to the display panel, the image signal output section equally dividing each of a right eye image and a left eye image into a plurality of divided images, the image signal output section generating image data so that the plurality of divided images of the right eye image and the plurality of divided images of the left eye image are alternately displayed at the plurality of display positions of the transmissive image display panel, respectively, and providing the image data to the plurality of pixels; and
   a light-emission control section for controlling the light source, the light-emission control section switching the emitting and non-emitting of the plurality of light-emitting regions at a predetermined cycle so that one of the two adjacent light-emitting region is emitted and the other light-emitting region is non-emitted; wherein
   the transmissive image display panel is arranged spaced apart from and facing the light source so that the light from each light-emitting region illuminates the pixel related to at least two divided images; and
   the image signal output section alternately provides data of the divided image of the left eye image and data of the divided image of the right eye image to each pixel in synchronization with the switching of the emitting and non-emitting of each light-emitting region by the light-emission control section, wherein in the horizontal direction, the light-emitting regions are arranged at the substantially same pitch as that of the pixels, and the light-emitting regions each have substantially the same width as that of each pixel, and wherein the number of the plurality of light-emitting regions in the horizontal direction is greater than that of the pixels.

23. The display unit according to claim 22, wherein the image signal output section provides an image signal to each pixel so that pixels positioned next to the relevant pixel in the horizontal direction displays divided images of an intermediate image with parallax between the left eye image and the right eye image.

24. The display unit according to claim 22, wherein each of the pixels displays one of red, green, or blue, and the transmissive image display panel displays a color image.

25. The display unit according to claim 22, wherein the transmissive image display panel is a transmissive image display panel for displaying a color image; and
   each pixel includes three partitions partitioned in a vertical direction of the transmissive image display panel, which three partitions display red, green, and blue.

26. The display unit according to claim 22, wherein the transmissive image display panel is a liquid crystal panel.

27. The display unit according to claim 22, wherein the transmissive image display panel is a PLZT (lead lanthanum zicronate titanate) panel.

28. The display unit according to claim 22, wherein the light source is an organic electroluminescence device.

29. The display unit according to claim 22, wherein the light source is planar.

30. The display unit according to claim 22, wherein the plurality of light-emitting regions is a plurality of strip-shaped regions parallel to each other.

31. The display unit according to claim 22, wherein the light source includes partitions for partitioning the light-emitting regions from each other.

32. The display unit according to claim 22, wherein the light source emits white light.

33. A method of controlling a display unit including a light source having a plurality of light-emitting regions and a transmissive image display panel for displaying an image when light from the light source is transmitted therethrough, the transmissive image display panel including a plurality of pixels and being arranged spaced apart from and facing the light source so that the light from each light-emitting region illuminates at least two pixels, wherein in a horizontal direction of the display unit, the light-emitting regions are arranged at the substantially same pitch as that of the pixels, and the light-emitting regions each have substantially the same width as that of each pixel, and wherein the number of the plurality of light-emitting regions in the horizontal direction is greater than that of the pixels, the method comprising the steps of:
   emitting at least one first selected light-emitting region among the plurality of light-emitting regions and non-light emitting at least one second selected light-emitting region among the light-emitting regions adjacent to the at least one first selected light-emitting region;
   alternately switching the emitting and non-emitting of the at least one first selected at least one second selected light-emitting region at a predetermined cycle;
   providing image data to the plurality of pixels so that the at least one first pixel of the plurality of pixels displays a first image and at the same time the at least one second pixel of the plurality of pixels adjacent to the at least one first pixel displays a second image; and controlling the plurality of pixels so that each pixel displays an image, different from the image displayed before switching of each light-emitting region, to display a plurality of images on the transmissive image display panel in sychronization with the switching of the emitting and non-emitting of each light-emitting region at the predetermined cycle.

34. The method according to claim 33, wherein when the first image and the second image are viewed by an observer with both eyes, the first and second images have a parallax between the left and right eyes.

35. The method according to claim 33, wherein the light source includes partitions for partitioning the light-emitting regions each other.

36. The method according to claim 33, wherein the light source emits white light.

37. The method according to claim 33, wherein the plurality of light emitting regions is a plurality of strip-shaped regions parallel to each other.

38. A computer program product for controlling a display device including a light source having a plurality of light-emitting regions, a transmissive image display panel for displaying an image when light from the light source is transmitted therethrough, the transmissive image display panel including a plurality of pixels, and being arranged spaced apart from and facing the light source so that light from each light-emitting region passes through at least two pixels, and a computer for controlling the emitting of the light source and providing an image signal to the display panel, wherein in a horizontal direction of the display unit, the light-emitting regions are arranged at the substantially same pitch as that of the pixels, and the light-emitting regions each have substantially the same width as that of each pixel, and wherein the number of the plurality of light-emitting regions in the horizontal direction is greater than that of the pixels, the computer program product comprising recording media enclosed with instruction steps which when executed by the computer cause the computer to perform steps including:

emitting at least one first selected light-emitting region of the plurality of light-emitting regions and at the same time non-emitting at least one second selected light-emitting region of the light-emitting regions adjacent to the at least one first selected light-emitting region;

alternately switching the emitting and non-emitting of the at least one first selected light-emitting region and the at least one second selected light-emitting region at a predetermined cycle;

providing image data to the plurality of pixels so that the at least one first pixel of the plurality of pixels displays a first image and at the same time the at least one second pixel of the plurality of pixels adjacent to the at least one first pixel displays a second image; and providing image data to the plurality of pixels so that each pixel displays an image different from the image displayed before switching of each light-emitting region in synchronization with the switching of the emitting and non-emitting of each light-emitting region at the predetermined cycle.

39. The computer program product according to claim 38, wherein when the first image and the second image are viewed by an observer with both eyes, the first and second images have a parallax between the left and right eyes.

40. The computer program product according to claim 38, wherein the light source includes partitions for partitioning the light-emitting regions from each other.

41. The computer program product according to claim 38, wherein the light source emits white light.

42. The computer program product according to claim 38, wherein the plurality of light-emitting regions is a plurality of strip-shaped regions parallel to each other.

43. A display unit for displaying a stereoscopic image by alternately displaying a first image and a second image; the display unit comprising:

a light source having a plurality of strip-shaped light-emitting regions parallel to each other;

a transmissive image display panel for displaying the first image and the second image when light from the light source is transmitted therethrough, the transmissive image display panel including a plurality of first columns each including a plurality of first pixels and a plurality of second columns each including a plurality of second pixels, in which each of the first column and each of the second column are adjacent to each other, the transmissive image display panel being arranged spaced apart from and facing the light source so that the light from each light-emitting region illuminates one of the first columns and one of the second columns adjacent to each other;

a light-emission control section for controlling the light source, the light-emission control section emitting a plurality of first light-emitting regions of the plurality of light-emitting regions and at the same time non-emitting a plurality of second light-emitting regions adjacent to each of the first light-emitting regions and alternately switching the emitting and non-emitting of the first light-emitting regions and the second light-emitting regions; and an image signal output section for providing data of the first image and data of the second image to the plurality of first columns and the plurality of second columns, respectively, the image signal output section displaying the first image on the plurality of first columns when the light-emission control section emits the plurality of first light-emitting regions, and displaying the second image on the plurality of second columns when the light-emission control section emits the plurality of second light-emitting regions, wherein in a horizontal direction of the display unit, the light-emitting regions are arranged at the substantially same pitch as that of the columns, and the light-emitting regions each have substantially the same width as that of each column, and wherein the number of the plurality of light-emitting regions in the horizontal direction is greater than that of the columns.

44. The display unit according to claim 43, wherein the light source includes partitions for partitioning the light-emitting regions from each other.

45. The display unit according to claim 43, wherein the light source emits white light.

* * * * *

UNITED STATES PATENT AND TRADEMARK OFFICE
CERTIFICATE OF CORRECTION

PATENT NO.         : 7,068,252 B2                                       Page 1 of 1
APPLICATION NO. : 10/869667
DATED              : June 27, 2006
INVENTOR(S)        : Tomohiko Hattori et al.

It is certified that error appears in the above-identified patent and that said Letters Patent is hereby corrected as shown below:

Column 9, line 44, please delete "$\alpha 2, \alpha 5, \alpha 8$, all to pixel 6" and insert therefore --$\alpha 2, \alpha 5, \alpha 8, \alpha 11$ to pixel 6--;

Signed and Sealed this

Tenth Day of April, 2007

JON W. DUDAS
*Director of the United States Patent and Trademark Office*